(12) United States Patent
Ishihara et al.

(10) Patent No.: US 7,068,187 B2
(45) Date of Patent: Jun. 27, 2006

(54) METHOD, APPARATUS AND COMPUTER PROGRAM PRODUCT FOR UNSTABILIZED APPROACH ALERTING

(75) Inventors: Yasuo Ishihara, Kirkland, WA (US); Scott Gremmert, Redmond, WA (US); Steven C. Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 762 days.

(21) Appl. No.: 09/775,455

(22) Filed: Feb. 2, 2001

(65) Prior Publication Data
US 2001/0052562 A1    Dec. 20, 2001

Related U.S. Application Data

(60) Provisional application No. 60/179,938, filed on Feb. 3, 2000.

(51) Int. Cl.
*G08G 5/00* (2006.01)
(52) U.S. Cl. .................. 340/951; 340/945; 340/970
(58) Field of Classification Search ................ 340/951, 340/948, 949, 958, 963–970, 973, 945, 935, 340/919, 972; 701/301; 379/37, 41, 44; 455/404.1, 414.4
See application file for complete search history.

(56) References Cited

U.S. PATENT DOCUMENTS

| | | | |
|---|---|---|---|
| 3,786,505 A * | 1/1974 | Rennie | 342/33 |
| 4,122,522 A * | 10/1978 | Smith | 701/15 |
| 4,316,252 A | 2/1982 | Cooper | 364/428 |
| 4,319,219 A | 3/1982 | Rein-Weston | 340/27 SS |
| 5,142,478 A | 8/1992 | Crook | 364/428 |
| 5,153,588 A * | 10/1992 | Muller | 340/968 |
| 5,220,322 A * | 6/1993 | Bateman et al. | 340/970 |
| 5,377,937 A * | 1/1995 | LaMay et al. | 244/185 |
| 5,668,541 A * | 9/1997 | Coquin et al. | 340/959 |
| 5,839,080 A * | 11/1998 | Muller et al. | 701/9 |
| 6,092,009 A | 7/2000 | Glover | 701/14 |
| 6,107,943 A * | 8/2000 | Schroeder | 340/945 |
| 6,477,449 B1 * | 11/2002 | Conner et al. | 701/4 |
| 6,600,977 B1 * | 7/2003 | Johnson et al. | 701/17 |

FOREIGN PATENT DOCUMENTS

WO    WO 98/04883    5/1998

OTHER PUBLICATIONS

Pendleton, "*Flying Jets*," McGraw-Hill Companies, New York, NY, 1996, Chap. 8 "Performance Calculations," pp. 258-259.

Davies, "*Handling the Big Jets*," Civil Aviation Authority, Borough Press, Swindon, England, Jun., 1996, Chap. 7 "Take Off and Landing," pp. 214-215.

Internet Web Page http://awin.larc.nasa.gov/welcome.htm, "Welcome to the NASA Langley Aviation Weather Information (AWIN) Homepage," last modified Jul. 13, 2000.

* cited by examiner

*Primary Examiner*—Phung T. Nguyen
(74) *Attorney, Agent, or Firm*—Black Lowe & Graham PLLC (57) ABSTRACT

A method, apparatus and computer program product for assisting the pilot of an aircraft in making a go-around decision. Various aircraft parameters are monitored during the approach to land and a risk level assessed. When the risk level exceeds a specified threshold, an alert is provided.

12 Claims, 5 Drawing Sheets

METHOD, APPARATUS AND COMPUTER PROGRAM PRODUCT FOR UNSTABILIZED APPROACH ALERTING

CROSS-REFERENCES TO RELATED APPLICATIONS

This application claims priority from copending U.S. Provisional Patent Application Ser. No. 60/179,938 filed Feb. 3, 2000 and titled "Unstabilized Approach Alerting Algorithm" the entire contents of which are incorporated herein by reference.

BACKGROUND OF THE INVENTION

The present invention relates to hazard alert systems for aircraft and more particularly to cockpit landing aids.

Landing an aircraft is the most demanding task in flying. During the landing process, the aircraft must transition from operating in three dimensions of motion to operating in only two dimensions and must be brought to a safe and complete stop. To perform the landing properly, the aircraft must approach the runway within certain attitude, track, speed and rate of descent limits. An approach outside of these limits can result in the aircraft making a "hard" landing, overrunning the runway end, or otherwise contacting the runway surface in an uncontrolled manner. Any one of these events has the potential to cause severe damage to the aircraft and may additionally result in passenger injuries or fatalities.

Factors which contribute to unstable approaches include: wind conditions that alter the speed and path of the aircraft, excessive speed and/or variations in the speed flown during the approach; failure to maintain a glide path that intersects the runway at the touchdown point; failure to track the center line of the runway; and equipment malfunctions. Pilots are trained to monitor these conditions during the approach and to initiate a go-around manouevre if the approach is unstabilized and a safe landing is not assured. The effectiveness of pilot training as a preventive measure ultimately depends, however, on the skill and judgment of the pilot in recognizing the unstabilized approach condition and executing the appropriate response as taught. Pilots with varying levels of skill are likely to respond differently to the same scenario.

In addition, unstabilized approaches are not the sole cause of runway overruns. A contaminated runway surface can reduce the braking effectiveness of the aircraft and increase the aircraft stopping distance. Thus, even with a stabilized approach, the aircraft may still be in danger of overrunning the runway end in some circumstances. The most common runway contaminates are rainwater and snow.

Automatic landing systems that guide the aircraft to touchdown do not completely solve the problems identified above. The control laws that govern operation of such systems may not always be able to reject disturbances such as those due to wind gusts, or certain equipment malfunctions. In such circumstances, the aircraft may still wind up on a destabilized approach and/or the automatic landing system must be disengaged. The pilot must still monitor and anticipate the need for a go-around even when such systems are in use. Landing systems also work best when precision approach guidance is available to the intended runway. Precision approaches provide both horizontal and vertical guidance on approach. Not all runways have precision approaches.

The go-around manouevre also requires concentration, judgment and skill to execute properly. Once the go-around decision is made, the aircraft's descent toward the runway must be arrested, full power applied, and the aircraft pitched up and configured for a climb. In some cases, when the go-around decision is made late, the aircraft may still contact the runway and may even bounce causing damage to the aircraft and possibly a crash landing. In certain runway environments, the aircraft must also clear an obstacle on the far end of the runway during the climb out. A late go-around decision in these environments may also result in the aircraft failing to clear the obstruction on the far end of the runway.

SUMMARY OF THE INVENTION

The present invention recognizes the problems not addressed by the prior art. Specifically, the present invention provides a method, apparatus and computer program product that assists the pilot in making a timely go-around decision. The present invention detects unstabilized approach conditions and conditions likely to result in a runway overrun; and alerts the pilot if a go-around is warranted or advised.

According to one aspect of the present invention, the invention monitors various aircraft performance parameters and assigns a risk factor value based on the status of these parameters. If the sum of the risk factors exceeds a first threshold amount, the invention outputs a go-around caution alert. If the sum of the risk factors exceeds a second threshold amount, the invention outputs a go-around warning or command. In one preferred embodiment of the invention, the parameters monitored include: the deceleration required to stop on the runway; the runway wind conditions, the aircraft groundspeed, the aircraft flight path angle, and the aircraft track. The parameters monitored may optionally be weighted according to the relative influence each parameter has on the severity of the destabilized approach.

According to another aspect of the present invention, the invention utilizes runway data from a terrain/runway database, and aircraft groundspeed to estimate the deceleration required to stop the aircraft after the point of touchdown. If the deceleration required exceeds the maximum deceleration of the aircraft, insufficient runway distance remains to stop the aircraft. The invention then provides a go-around warning. In a preferred embodiment of the invention, the invention receives input(s) that enable the calculation of required deceleration to account for contaminated runway conditions such as snow and ice.

According to still another aspect of the present invention, the aircraft position on approach is compared to an imaginary corridor from which a stabilized approach can be made. If the aircraft deviates from this imaginary corridor, the invention evaluates the risk of the deviation and issues a go-around caution or advisory as appropriate.

According to yet another aspect of the present invention, the invention is hosted on an existing aircraft system having a general purpose processor and alert drivers, such as an Enhanced Ground Proximity Warning System computer.

Further advantages and features of the present invention will be described in greater detail below with reference to the drawings.

DESCRIPTION OF THE SPECIFIC EMBODIMENTS

Figure 1:
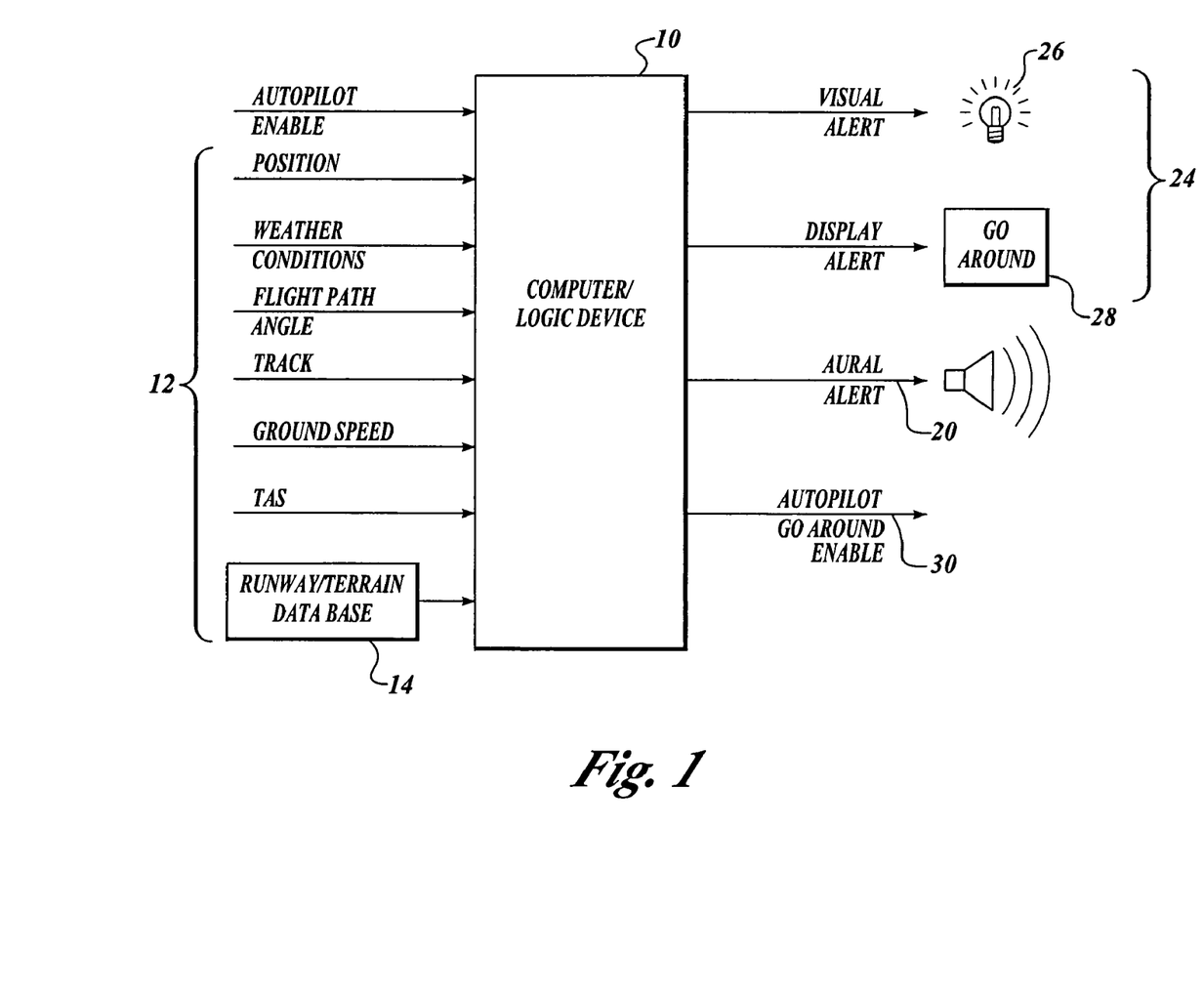
FIG. 1 is a system level block diagram of the present invention according to a preferred embodiment.

FIG. 1 contains a block diagram of a system useful for implementing the go-around advisory alerts of the present invention. In the system of FIG. 1, a computer, or logic device 10 receives a plurality of inputs 12 useful for monitoring the performance of the aircraft during the final approach to a runway. Inputs 12 may include a runway/terrain database 14 useful for determining the runway heading, available runway length runway slope, nominal glideslope angle, and identifying any obstacles along the approach course and runway ends. The invention is not limited to input parameters 12 as shown in FIG. 1. Other parameters useful for determining unstable approach or possible runway overruns may be used. Input parameters useful for deriving parameters 12 may also be input to logic device 10 and processed as required to obtain the desired parameters as is well known to those of skill in the art. For example, position data may be used to derive groundspeed and track.

Parameters 12 may include surface weather observations and runway condition data. In one embodiment of the invention, the weather and/or runway condition data are uplinked to the aircraft via a datalink. The datalink may include the Aviation Weather Information Network (AWIN) system or other datalink such as for example, an Aircraft Addressing and Reporting System (ACARS) device.

Computer or logic device 10 may be a microprocessor, firmware, executable code, an existing aircraft subsystem having a general purpose processor or any combination thereof. In a preferred embodiment of the invention, logic device 10 comprises an Enhanced Ground Proximity Warning System (EGPWS) computer. The EGPWS also includes a terrain database 14. The terrain data included in terrain database 14 may include natural and/or man-made terrain features such as for example: geographic data and/or runway data and/or obstacle data, or any combination thereof. Other examples of existing aircraft systems with a general purpose processor suitable for hosting the present invention include, but are not limited to: the Traffic Collision and Avoidance System (TCAS); and flight management system (FMS).

Logic device 10 processes inputs 12 and assesses a risk factor according to how indicative each parameter is of an unstabilized approach condition that could result in an uncontrolled landing. If the total risk factor exceeds a predetermined threshold, logic device 10 outputs an alert. The alert may comprise either an aural alert 20 and/or a visual alert 24. Visual alert 24 may further comprise a cockpit lamp 26 and/or a cockpit display 28. The alert shown on cockpit display 28 may be textual: for example, the phrase "go-around" may be shown in some portion of display 28; or a graphical symbol may be used. The textual phrase or graphical symbol may optionally be colored to indicate whether the "go-around" alert is merely advisory or a warning indicating pilot action is required.

Logic device 10 may optionally be coupled to the aircraft autopilot and autothrottle systems as shown by the signal output on line 30 of FIG. 1. If the risk factor as determined by logic device 10 indicates that a go-around manouevre is required, a signal may be asserted on line 30 to automatically engage the go-around mode of the aircraft's autopilot. The autopilot command feature may be disengaged or enabled by autopilot enable signal 32. Signal 32 is preferably configurable and may be selected, for example, by a programming pin at time of installation. Optionally, signal 32 may comprise a cockpit switch that allows the pilot to select/deselect the autopilot automatic activation prior to flying the approach and to disengage operation of signal 30 at any time.

Figure 2:
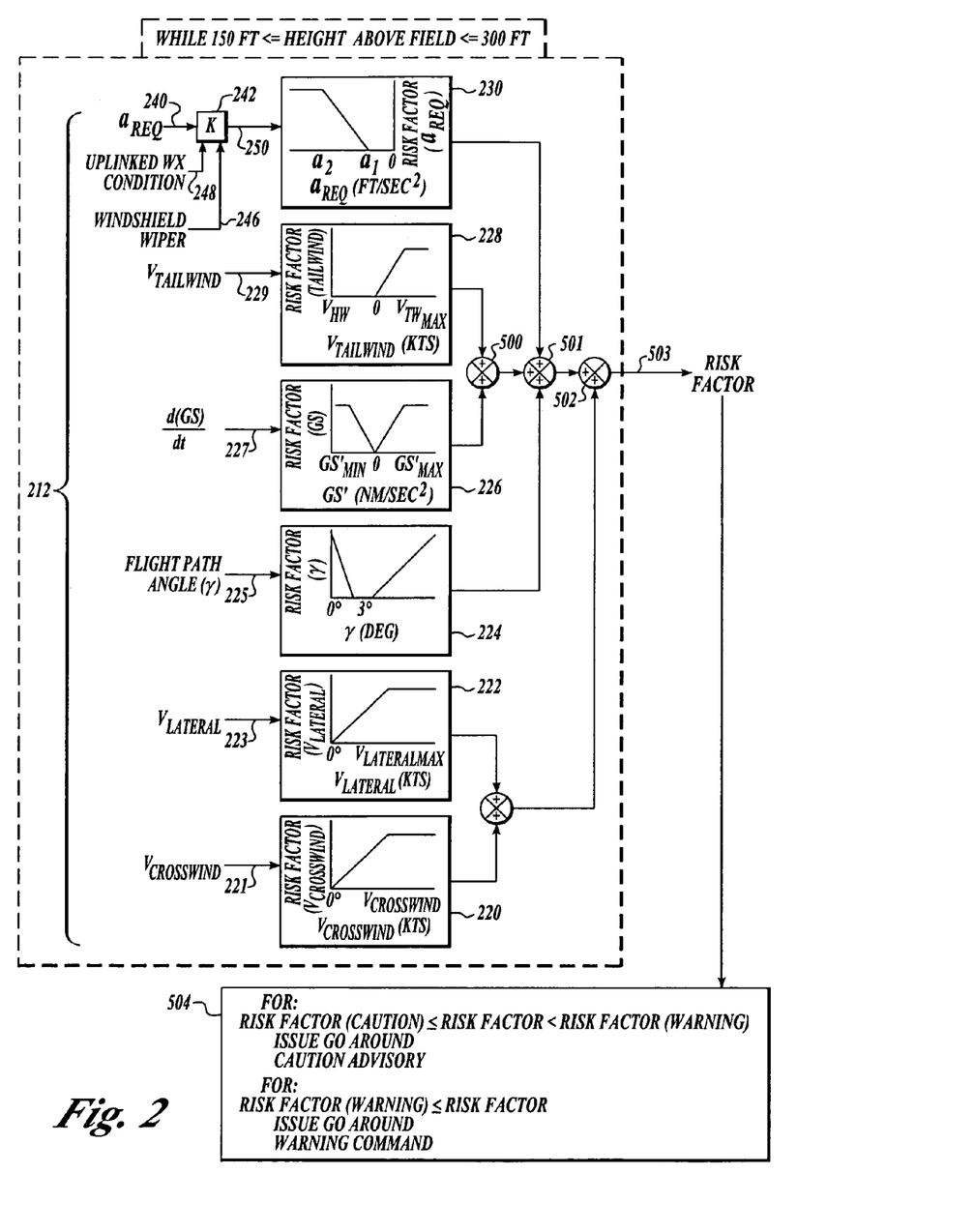
FIG. 2 is a block diagram of an unstabilized approach alerting logic according to one embodiment of the present invention.

FIG. 2 illustrates unstabilized approach alerting logic according to a preferred embodiment of the present invention. A plurality of functions 200 evaluate various parameters 212 and assess a risk of uncontrolled landing or runway overrun due to the contribution of the input parameters 212. A preferred embodiment of the invention includes six individual functions, 220, 222, 224, 226, 228 and 230.

A first function 220 assigns a risk factor to the approach due to runway cross winds. In a cross wind landing, the aircraft must either be crabbed into the wind during approach and then realigned with the runway centerline just prior to touchdown; or slipped to a landing. Both techniques require precise control to prevent excessive side loads on the landing gear at touchdown. In addition, imprecise technique to compensate for the crosswind during flare and touchdown, may cause the aircraft to drift uncomfortably close to the runway edge. Thus, the present invention monitors the risk of an uncontrolled landing due to the magnitude of the runway crosswind. When the observed cross wind 221 exceeds a nominal maximum operating value, $V_{CWmax}$, the risk of an uncontrolled landing is high and a go-around is advised. The normalized risk factor output by function 220 in such conditions equals 1.

The nominal value chosen for $V_{CWmax}$ can be chosen to vary by aircraft type and/or individual aircraft operator. Each aircraft has a maximum demonstrated crosswind which represents the maximum crosswind encountered during flight test and certification of the aircraft. This value does not necessarily represent the maximum cross wind in which a safe landing can be made. Thus, in the absence of other data, $V_{CWmax}$ may be set at or slightly above this value. Most commercially operated aircraft, however, also have maximum allowable cross winds specified either in the aircraft flight operations manual or in the airline operating procedures. Preferably, when available, these latter values are used to specify $V_{CWmax}$. The risk factor due to cross winds may optionally be additionally modified to account for narrow runway widths. Runway widths for the intended runway of landing are stored in database 14 as shown in FIG. 1.

Function 222 monitors whether the aircraft has consistently tracked inbound on the runway centerline. Excursions in lateral velocity to either side of the runway track indicate the pilot is making corrections to align the aircraft with the runway and that the approach is not stabilized. The value of $V_{Lateral\ max}$ varies depending upon the maneuverability of the aircraft. The value of $V_{Lateral\ max}$ may optionally be made to vary with proximity to the runway. In a preferred embodiment of the invention, $V_{Lateral\ max}$ equals the velocity corresponding to the maximum side load permitted on the landing gear of the aircraft as measured with reference to the runway centerline. When the absolute value of the lateral velocity 223 exceeds $V_{Lateral\ max}$, the normalized risk factor for an unstabilized approach is set equal to one. Lateral velocities less than this value are assigned risk factors based on the linear function shown in function generator 222. Functions other than linear functions may be used as appropriate.

Function 224 monitors the glide path to the runway as measured by the aircraft flight path angle 225. Most runway approaches have a nominal glidepath of 3° with a tolerance of +/−0.5 around this nominal value typically acceptable. Aircraft approaching the runway at too steep an angle have an excess amount of energy that must be dissipated during the landing flare and touchdown. This condition not only places the aircraft at risk for undercarriage damage, but also may result in the aircraft floating down the runway during the flare in order to bleed off the excess energy. The runway distance consumed during the float is no longer available to stop the aircraft after touchdown and a runway overrun condition is possible.

Flight path angles beneath the nominal value create a hazard that the aircraft will land short; or be in a landing attitude from which it will be difficult to properly execute the flare. The resulting landing may damage the aircraft undercarriage, or in severe cases result in a stall as the pilot attempts to stretch the glide towards the runway.

Certain airports throughout the world, have approach courses that differ significantly from the nominal 3° value. Function 224 may be modified in accordance with the specific glide path for the intended runway. In a preferred embodiment of the invention, the glide path data may be stored in database 14 of FIG. 1.

Function 226 monitors changes in the aircraft groundspeed. In a steady state wind condition, groundspeed will be substantially constant on a stabilized approach. In an unstabilized approach or an approach with gusty conditions, groundspeed will not achieve a steady state value. In the embodiment of FIG. 2, the change in groundspeed with respect to time, d(GS)/dt, is input as signal 227, to function generator 226. The groundspeed may be obtained from a global positioning system or derived from other onboard navigation systems as is well known to those of skill in the art. Preferably, the signal 227 is filtered by introducing a time lag, or by other measures known to those of skill in the art. The filter reduces the possibility of nuisance alerts resulting from transients in the speed data.

Optionally, the change of airspeed may be measured and input into a function generator 226. Airspeed, like groundspeed, ideally remains in a steady state condition during the approach. Changes in airspeed may be processed in a manner similar to that described above for groundspeed. The absolute value of airspeed may also be monitored. Aircraft normally fly a constant airspeed, unique to that aircraft and landing configuration on approach. For each knot of airspeed in excess of the reference value, the aircraft rollout distance increases by approximately 2%. This relationship may likewise be used to asses a risk factor value to the approach.

In a preferred embodiment of the invention, however, the maximum risk factor is assessed when the change in speed equals the change in speed that would be associated with a windshear event. This risk allocation makes the present invention consistent with the warnings and recovery actions provided by other hazard avoidance systems. As shown in FIG. 2, function generator 226 varies the risk factor linearly between the maximum allowable groundspeed change and the stabilized approach condition. Function 226 as drawn in FIG. 2 also shows that the function is symmetrical for both decreasing and increasing groundspeed. As such, it would be possible to merely input the absolute value of the groundspeed change into function generator 226. Optionally, however, if based on the geography of the airport, decreases/increases in groundspeed were more or less critical, function 226 need not be made symmetrical.

Function 228 monitors the tailwind component on landing. Landing with a tailwind requires that the aircraft fly at a higher groundspeed in order to maintain the approach airspeed. The higher groundspeed causes the aircraft to float down the runway during the landing phase with insufficient runway remaining to stop the aircraft after touchdown. With a headwind, the groundspeed decreases and the aircraft touches down at a slower speed. Thus, function 228 does not add a risk factor element when a steady state headwind is present. Runway wind data signal 229 may be obtained from an uplinked weather report or AWIN.

Function 230 evaluates the risk of a runway overrun. Function 230 receives as input the deceleration 240 required to stop on the available runway length. As explained in greater detail below, deceleration 240 may be multiplied by a safety factor, or gain K, 242 to account for contaminated runway conditions that increase the aircraft stopping distance.

The net deceleration required 250 is input to function generator 230. When the deceleration required equals or exceeds the maximum deceleration of the aircraft, $a_2$, the aircraft cannot be stopped on the runway and a go-around is advised. The normalized risk factor is set to 1.0. When the deceleration equals or is less than the aircraft's normal deceleration performance, $a_1$, then there is little risk of aircraft overrun and the risk factor output from function generator 220 is zero. Decelerations between the maximum value $a_2$ and the nominal aircraft value $a_1$, have some associated risk of runway overrun. In function 220, this relationship is shown as linear. Other mathematical correlations, may be used, however, as appropriate.

Figure 3:
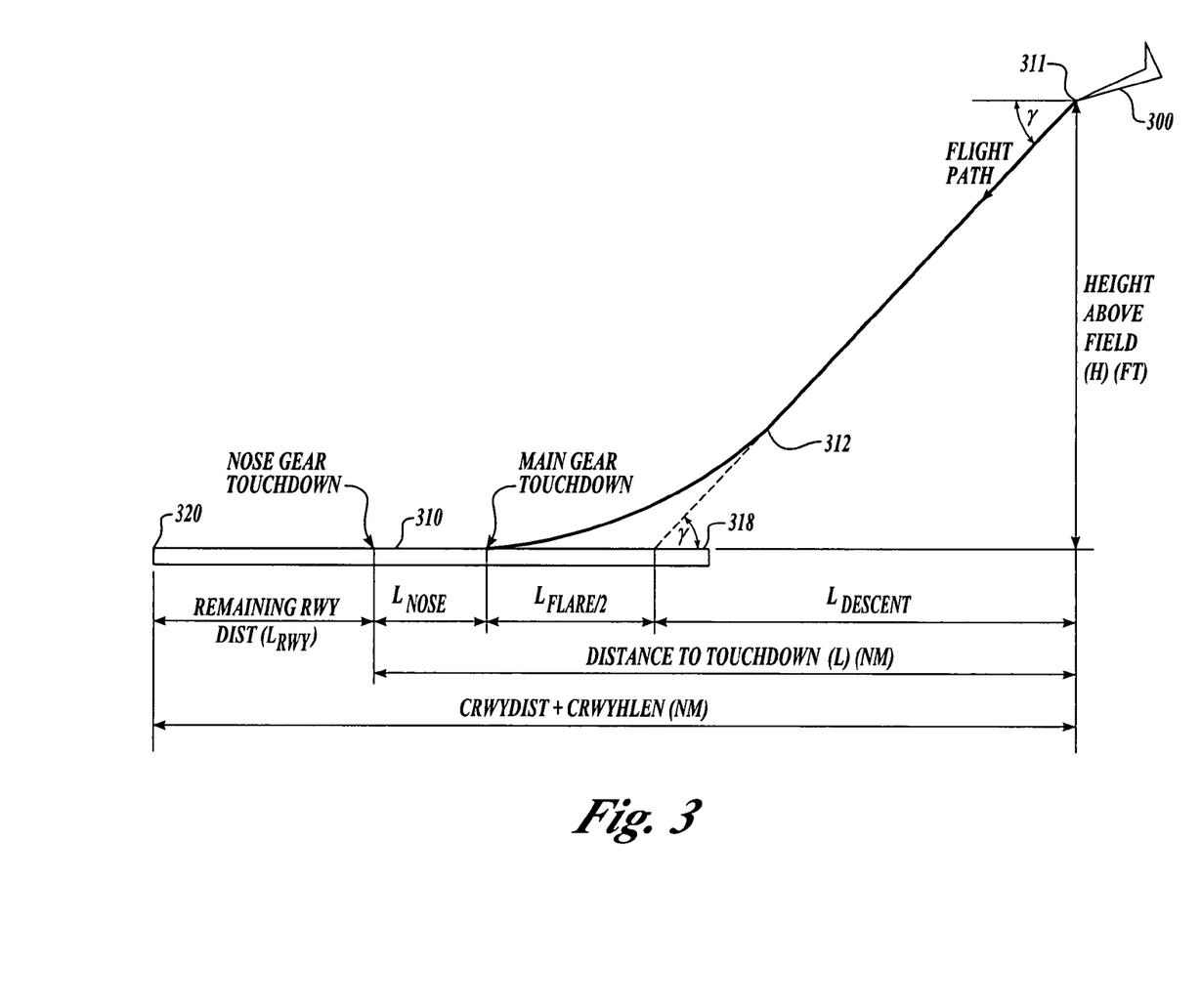
FIG. 3 is a diagram illustrating required stopping distance and deceleration according to one embodiment of the present invention.

The deceleration required is obtained according to the relationships shown in FIG. 3. For the aircraft 300 to land safely on the runway 310, aircraft 300 must be able to decelerate to a complete stop in the runway distance, $L_{Rwy}$, remaining after touchdown. In FIG. 3, aircraft 300, located at point 311, is on some flight path angle, $\gamma$, while descending on approach to the airport. At some point 312, aircraft 10 transitions to the landing attitude, or flare, required for touchdown. Touchdown is complete when both the nose and main gear touchdown. Aircraft 10 then has the remaining runway length in which to stop.

The distances required for descent, flare and touchdown may be calculated according to any one of several formulas well known to those of ordinary skill in the art. In a preferred embodiment of the invention, the following equations are used as found in *Aeroplane Aerodynamics and Performance* by Jan Roskam. The landing distance for the descent phase may be computed as a function of flight path angle, $\gamma$, and height above the runway as follows:

$$L_{descent} = \frac{H[\text{nm}]}{\text{TAN}(\gamma)} \qquad \text{Eq. (1)}$$

The portion of the runway consumed due to flare is:

$$L_{\frac{1}{2}flare} = \frac{GS^2[\text{nm}^2/\text{hr}^2]}{g(n_{FL} - 1)[\text{nm}/\text{hr}^2]} \text{TAN}\left(\frac{\gamma}{2}\right) \qquad \text{Eq. (2)}$$

where:
GS=groundspeed;
g=the gravitational constant; and
$n_{FL}$ is the load factor during the flare manouevre. Typical values for $n_{FL}$ range between approximately 1.04 and 1.08 on most aircraft. The portion of the runway consumed during nosegear touchdown is given by:

$$L_{nose} = \frac{2[\text{sec}] GS[\text{nm/hr}]}{3600[\text{sec/hr}]} \quad \text{Eq. (3)}$$

The total length required for touchdown from the point 311 is therefore the sum of Eqs. 1–3:

$$L = L_{descent} + L_{\frac{1}{2}flare} + L_{nose} \quad \text{Eq. (4)}$$

Given position 311, the location of either runway endpoint 318, or 320; and the total distance to touchdown, L, the remaining runway length $L_{Rwy}$, can then be calculated. The remaining runway length is that distance available to stop the aircraft upon touchdown. The deceleration required to stop within this distance is governed by the equation:

$$a_{req} = \text{Acceleration Required to Stop} \quad \text{Eq. (5)}$$
$$= \frac{-GS^2[kts^2]}{2xL_{Rwy}[\text{nm}]} \times \frac{6076[\text{ft/nm}]}{3600^2[\text{sec}^2/\text{hr}^2]} [\text{ft/sec}^2]$$

If the acceleration required exceeds the maximum deceleration available to the aircraft using thrust reverse and maximum braking force, then the aircraft is unable to stop in the available runway using normal operating procedures and a go-around is advised.

The deceleration required value may be multiplied by gain 242 to account for runway surface conditions. In the embodiment of FIG. 2, gain 242 may be a preset or scaleable value activated when certain weather conditions are present. Typically, the impact of runway contaminants on aircraft performance is expressed in terms of lengthening the landing roll by a certain percentage. The FAA recommends increasing landing roll distances by 15% when landing on a contaminated runway. Linda Pendelton in *Flying Jets* lists several runway conditions and the associated landing roll increases. These values are listed in the table below.

TABLE 1

IMPACT OF VARIOUS CONDITIONS ON LANDING ROLL DISTANCE

| CONDITION | IMPACT |
| --- | --- |
| Approach speed in excess of $V_{ref}$ | Add 2% for each knot of excess speed |
| Headwind | Decrease by 15% for every 10 knots of headwind |
| Temperature | For each 15° F. increase above standard temp., add 4% |
| Uphill runway slope | Decrease by 4% for each degree of slope |
| Downhill runway slope | Increase by 6% for each degree of slope |
| Wet Runway | Increase by 25% |
| Wet and Slippery Runway | Increase by 60% |
| Icy | Increase by 125% |

Substituting the increase in landing roll values, k, into equation (6) below and solving for decreased maximum available deceleration ($a_{eff}$) in terms of the increased stopping distance of the aircraft yields equation (7):

$$a_{max} = \frac{(-GS_{maxallowable})^2[kts^2]}{2L_{rollout}} \times \frac{6076[\text{ft/nm}]}{3600^2[\text{sec}^2/\text{hr}^2]} \quad \text{Eq. (6)}$$

$$a_{eff} = \quad \text{Eq. (7)}$$
$$\frac{(-GS_{maxallowable})^2[kts^2]}{2L_{rollout}} \times \frac{6076[\text{ft/nm}]}{3600^2[\text{sec}^2/(\text{hr})^2]} \frac{1}{(1+\Sigma k)} = \frac{a_{max}}{(1+\Sigma k)}$$

To stop in the available runway length $L_{RWY}$:

$$a_{req} \leq a_{eff} \quad \text{Eq. (8)}$$

or rewriting in terms of $a_{max}$:

$$a_{req} \leq \frac{a_{max}}{(1+\Sigma k)} \quad \text{Eq. (9)}$$

or $$(1+\Sigma k)a_{req} \leq a_{max} \quad \text{Eq. (10)}$$

From equation (10), gain 242 may therefore be expressed as:

$$K = (1+\Sigma k) \quad \text{Eq. (11)}$$

The presence of a contaminated runway and the type of contamination may be determined in a variety of ways. For example, if the aircraft windshield wipers are in use, the runway is probably wet. A signal 246 is therefore asserted whenever the windshield wipers are in operation. Optionally, or in addition to signal 246, weather conditions uplinked from a weather forecast such as, for example, A WIN, can be used to indicated the runway surface conditions. For example, if the AWIN report contains the code for precipitation in the form of rain, snow, freezing rain or sleet, the presence of these codes may be detected and used to assert a signal 248 to activate gain 242.

Figure 4:
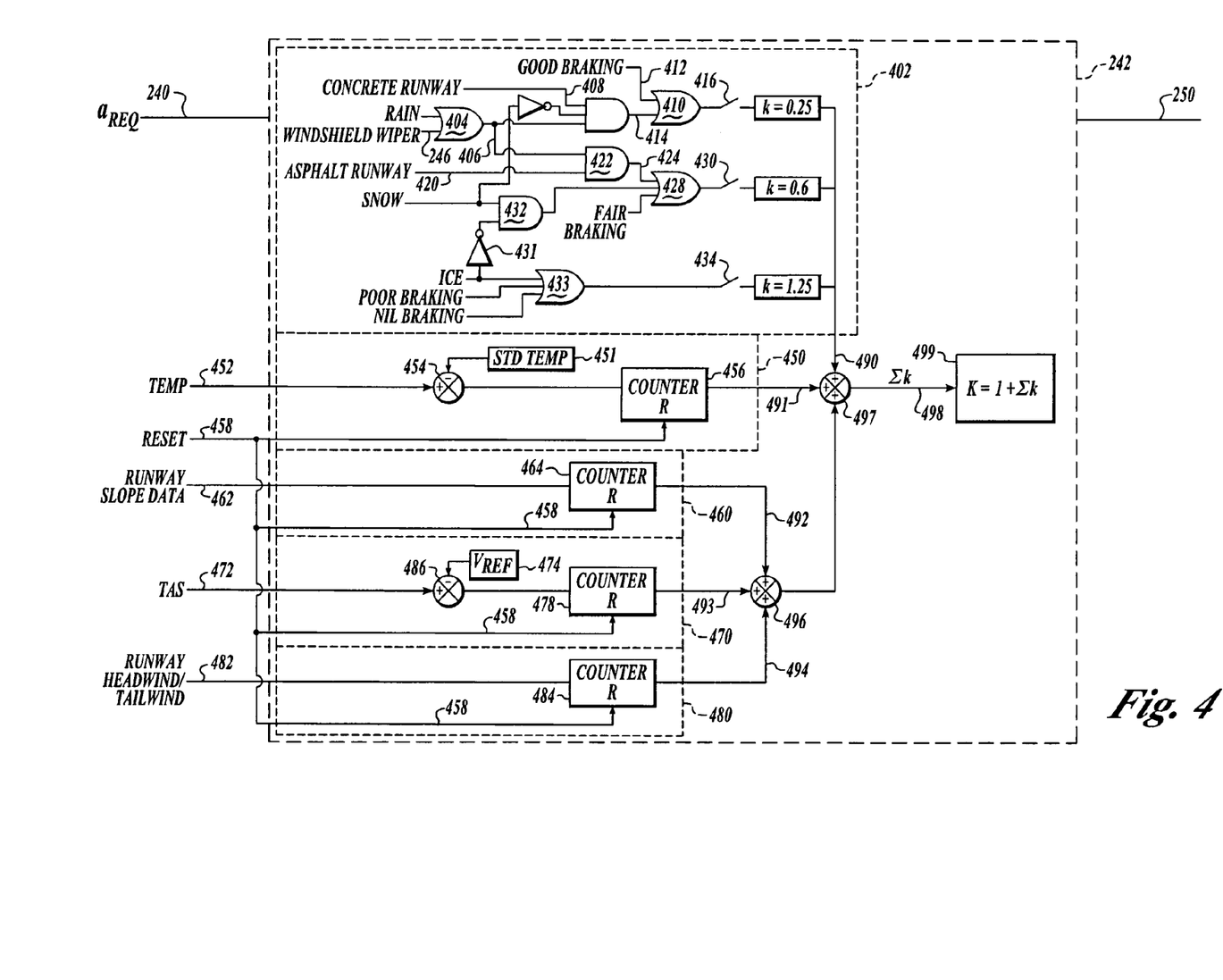
FIG. 4 is a diagram illustrating logic for determining the acceleration required to stop on a runway under various conditions.

The specific value of gain 242 may be varied depending upon the specific runway condition reported. For example, snow may warrant use of a larger gain, K, than does rain. Runway breaking performance parameters are sometimes occasionally included in reported weather. The braking performance values may also be used as available to control gain 242. FIG. 4 diagrams logic useful for obtaining a composite value of K based on various runway conditions and permits several types of runway conditions to be accounted for simultaneously.

A first portion 402 of FIG. 4 includes logic to account for various runway surface conditions. A logical OR function 404 asserts a signal 406 when either the aircraft windshield wipers are functioning or the weather data uplinked to the aircraft indicates rain. If these conditions are present and the runway surface is concrete, per Pendelton, the runway surface may be considered wet and k=0.25. Signal 408 is asserted whenever the intended runway of landing is concrete. In a preferred embodiment of the invention, the runway surface material data is stored in database 14 as shown in FIG. 1.

A braking action report if available, that indicates that the runway braking action is "good," also sets k=0.25 as indicated by logical OR function 410. The runway braking action report is obtained in the AWIN or other weather uplink received aboard the aircraft when available. Thus, when either a good braking action signal 412, or signal 414 is asserted, latch 416 activates to set k=0.25.

If signal 406 is asserted but an asphalt runway is in use as indicated by signal 420, a logical AND function 422 asserts signal 424 indicating that k should preferably be set equal to 0.6 through operation of logical OR function 428 and latch 430. Logical OR function 428 will also activate latch 430 when either snow is reported or a fair braking action report is received. A logical inverter 431 and a logical AND function 432 prevent the snow signal from latching latch 430 when both snow and ice are reported. A logical OR function 433 operates latch 434 to set k=1.25 when either ice, poor braking action, or nil braking action are reported on the runway.

A second portion 450 of FIG. 4 compares the standard atmospheric temperature 451 to the current surface temperature 452 at junction 454. Standard atmospheric temperature 451 can be stored in a lookup table, or other memory device, or obtained from database 14. Current surface temperature 452 may be obtained from the AWIN or other uplinked weather data, or optionally estimated from the aircraft's outside air temperature instrumentation. Temperature data obtained from the aircraft temperature sensor may be additionally corrected for aircraft altitude if desired. An up/down logical counter, or function generator 456 increments and decrements the value of k for each 15° degrees F. difference between standard temperature 451 and surface temperature 452 according to the guidelines of Table 1.

Operation of counter/function generator 456 may be reset or reinitialized by reset signal 458. In a preferred embodiment of the invention, signal 458 comprises a signal indicating that the landing gear has been extended. Other signals suitable for indicating that the aircraft is on approach may be used. Such signals may include, but are not limited to: a glideslope or localizer acquisition signal or landing flap configuration signal.

A third portion 460 of FIG. 4 adjusts the value of k according to the runway slope data 462. In a preferred embodiment of the invention, runway slope data 462 is obtained from database 14. A counter or logical function generator 464 increments/decrements k for variations in runway slope according to Table 1. Function generator 464 is also reset by signal 458.

A fourth portion 470 of FIG. 4 adjusts the value of k to account for excess airspeed on approach. The aircraft true airspeed 472 is compared to the reference approach speed 474 at junction 476. A counter or function generator 478 increments k for increases in approach speed according to Table 1. Counter/function generator 478 is also reset by signal 458.

A fifth portion 480 of FIG. 4 adjusts the value of k to account for the headwind and tailwind component of the runway surface winds. When portion 480 is included in the calculation of gain 242, function generator 228 need not be included in the logic of FIG. 2. If signal 482 indicates a headwind is present, the value of k is decremented by counter or function generator 484 according to Table 1. When a headwind is present, the value of k is less than zero. When signal 482 indicates a tailwind, k is incremented in the manner described in Table 1 for headwinds, but k is now greater than zero. The headwind, tailwind component may be either provided directly in the uplinked weather data, or optionally computed by the present invention, or other device aboard the aircraft. The headwind/tailwind component is readily obtained from the runway heading and magnitude and direction of the surface winds. Similar calculations may be used to obtain the cross wind value 221 of FIG. 2.

The value of k output by each of regions 402, 450, 460, 470, and 480 on lines 490–494 are summed at junctions 496 and 497 to obtain a total value, k, 498. A function generator 499 squares total 498 and inverts it to obtain the composite value k, 242 per equation (7). The gain multiplied acceleration signal 250 is then input to function generator 230 of FIG. 2 in the manner previously described.

Note that the effect of changes in $V_{REF}$, temperature and headwind as listed in Table I are included in the measure of groundspeed. Thus, groundspeed and changes in groundspeed over a reference value may optionally be used to calculate that portion of K due to these effects. Optionally, a function generator may be directly incorporated into the logic of FIG. 2 that assesses a risk factor leased on groundspeed in lieu of incorporating such calculations into the logic of FIG. 4.

Figure 5A:
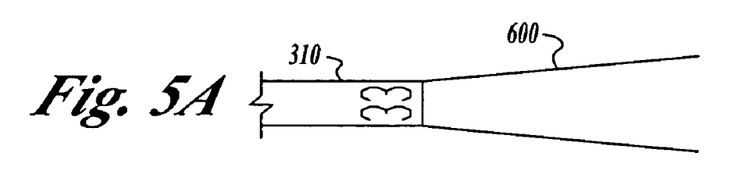
FIGS. 5A–5D diagram use of a stabilized approach alerting corridor according to one embodiment of the present invention.
Figure 5B:
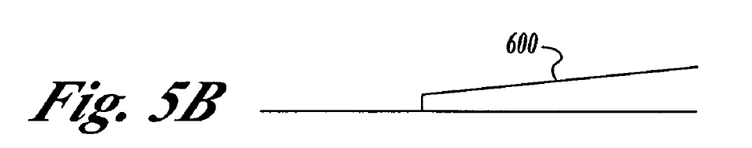

The risk factors output by each of function the function generators 220, 222, 224, 226, 228 and 230 of FIG. 2 are summed by junctions 500, 501 and 502 to obtain a composite risk factor signal 503. Risk factor 503 is compared to the predetermined threshold risk values denoting a go-around caution advisory and a go-around warning as shown by function generator 504. For risk value 503 less than the go-around warning risk value but greater or equal to the caution threshold value, a go-around caution alert is asserted. For risk value 503 greater than the go-around warning threshold, a go-around warning alert is asserted. In a preferred embodiment of the invention, the unstabilized approach alert operates while the aircraft is between 150 feet and 300 feet above and within one nautical mile of the runway. These values provide sufficient time to execute the go-around manouevre for most aircraft yet are not so far out on the approach that nuisance alerts become problematic. The invention is not limited to the specific functions shown in FIG. 2. Other functions and parameters indicative of an unstabilized approach may be substituted for or used in addition to the functions and parameters of FIG. 2. For example, a virtual approach path corridor 600 may be constructed as shown in FIGS. 5A and 5B. When an instrument landing system (ILS) is in use, the boundaries of such a corridor are defined by full deflection of the glideslope and localizer needles on the cockpit instrumentation used to fly the approach. A signal indicating full deflection may be coupled to the logic of FIG. 2 and a go-around warning asserted for full deflection.

Not all runways are equipped with ILS or localizer landing aids, however. Some runways have only non-precision approaches or no approach guidance. Furthermore, the FAA has announced plans to convert many instrument approaches to approach courses based on global positioning system (GPS) signals. Thus, according to another possible embodiment of the present invention, the present invention may construct virtual corridor 600 and periodical check whether the position of the aircraft lies within the bounds of the defined corridor 600. Corridor 600 may optionally be modified from its nominal shape to account for terrain specific to the approach course.

Figure 5C:
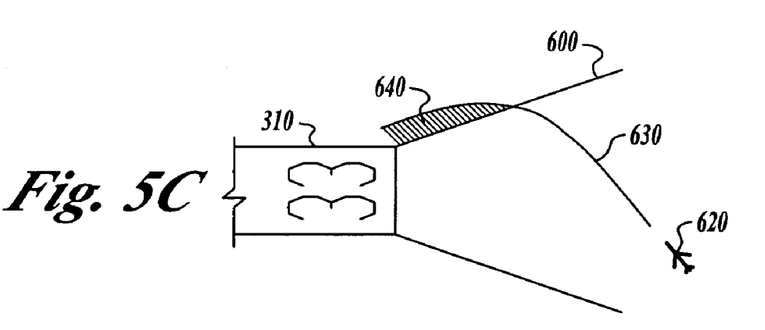
Figure 5D:
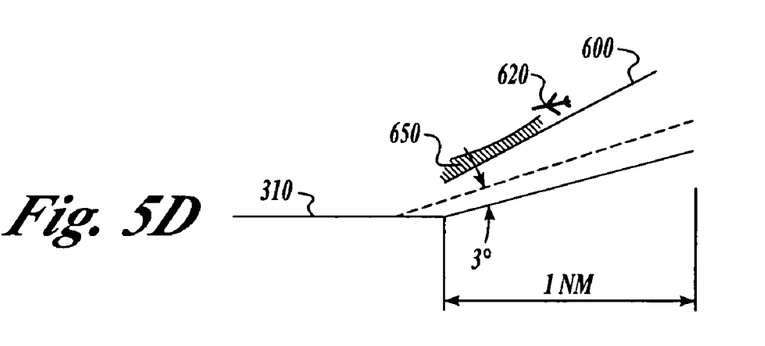

Corridor 600 may additionally be used in the manner taught by FIGS. 5C and 5D. In FIG. 5C, the aircraft 620 is attempting to realign with the runway centerline, but the correction required will ultimately cause the aircraft to travel along path 630 and enter region 620 outside corridor 600. FIG. 5D illustrates an aircraft manouevre that results in aircraft 620 entering region 650 above corridor 600. The present invention may include logic to detect such conditions based on the present and predicted aircraft position and to assert an alert signal when such conditions are detected.

Preferred embodiments of the invention have now been described. Variations and modifications will be readily apparent to those of skill in the art. For these reasons, the invention is to be interpreted in light of the claims.

What is claimed is:

1. A method for alerting the pilot of an aircraft to a potential go-around condition comprising the steps of:
   monitoring a plurality of parameters indicative of an unstabilized approach;
   assigning a risk of go-around value to each of said parameters;
   summing the assigned risk values; and
   asserting an alert signal when said summation exceeds a predetermined threshold amount, asserting further comprises:
      asserting a go-around caution alert signal when said value exceeds a first threshold amount and is less than a second threshold amount; and
      asserting a go-around warning signal when said value exceeds said second threshold amount.

2. The method of claim 1 wherein said step of monitoring a plurality of parameters includes the step of monitoring a change in a speed of the aircraft.

3. The method of claim 1 wherein said step of monitoring a plurality of parameters includes the step of monitoring a runway wind condition.

4. The method of claim 1 wherein said step of monitoring a plurality of parameters includes the step of monitoring a flight path angle of the aircraft.

5. The method of claim 1 wherein said step of monitoring a plurality of parameters includes the step of monitoring a position of the aircraft.

6. The method of claim 1 wherein said step of monitoring a plurality of parameters includes the step of monitoring a track of the aircraft.

7. The method of claim 1 wherein said step of asserting an alert signal comprises the step of commanding an autopilot go-around maneuver.

8. A method of alerting the pilot of an aircraft to a potential go-around condition comprising the steps of:
   monitoring a plurality of parameters indicative of a runway landing length required;
   assigning a risk of runway overrun value for each of said plurality of parameters;
   summing the assigned risk values; and
   asserting an alert signal when said summation exceeds a predetermined threshold value,
   wherein the plurality of parameters include runway length,
   wherein said step of asserting an alert signal further comprises the steps of:
      asserting a go-around caution alert signal when said value exceeds a first threshold amount and is less than a second threshold amount; and
      asserting a go-around warning signal when said value exceeds said second threshold amount.

9. The method of claim 8 wherein said step of monitoring a plurality of parameters includes the step of monitoring a deceleration required to stop the aircraft.

10. The method of claim 8 wherein said step of monitoring a plurality of parameters includes the step of monitoring a runway surface condition.

11. The method of claim 8 wherein said step of monitoring a plurality of parameters includes the step of monitoring at least one atmospheric condition.

12. The method of claim 8 wherein said step of asserting an alert signal comprises the step of commanding an autopilot go-around maneuver.

* * * * *